Figure 1:
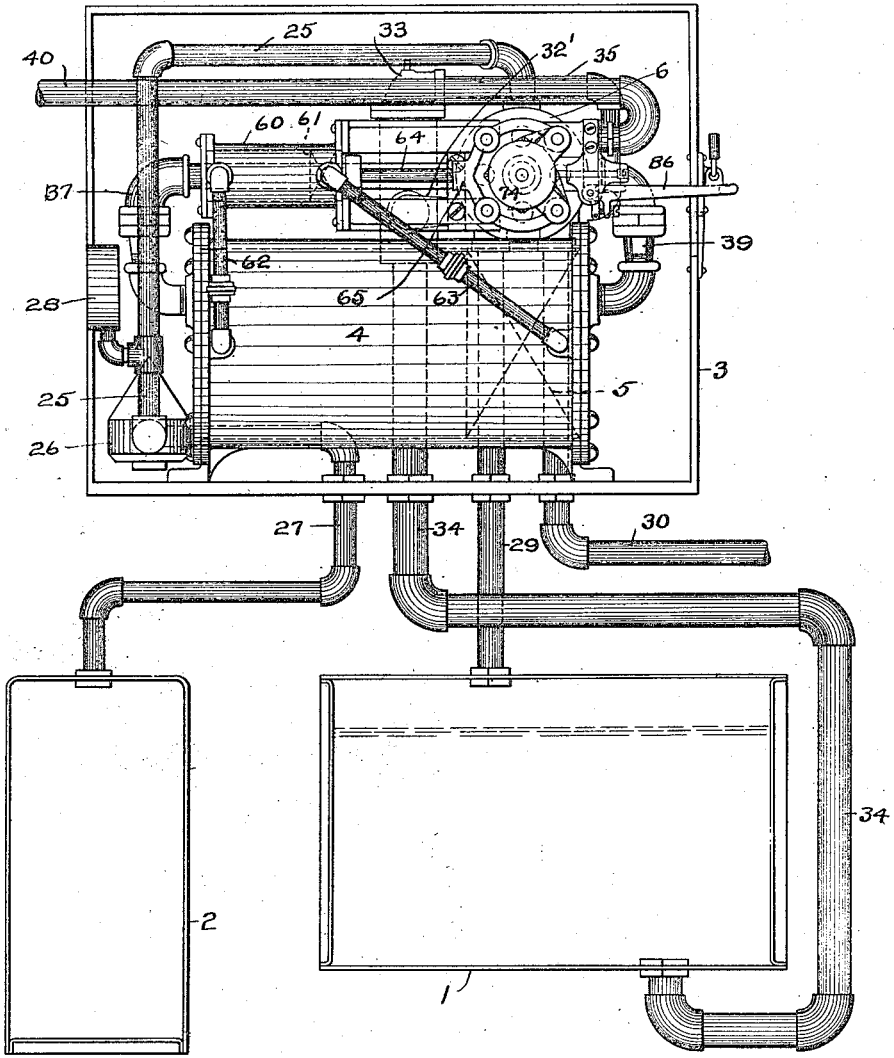

G. S. HANFORD.
LIQUID MEASURING AND DELIVERY DEVICE.
APPLICATION FILED JAN. 5, 1911.

1,046,781.

Patented Dec. 10, 1912.
5 SHEETS—SHEET 1.

Witnesses
Isaac H. Jacobs
Helen F. Glenn.

Inventor
George S. Hanford
by Taylor & Hulse
Attorneys

G. S. HANFORD.
LIQUID MEASURING AND DELIVERY DEVICE.
APPLICATION FILED JAN. 5, 1911.

1,046,781.

Patented Dec. 10, 1912.

5 SHEETS—SHEET 2.

Witnesses
Isaac N. Taylor
Helen F. Glenn

Inventor
George S. Hanford
By
Taylor & Hulz
Attorneys

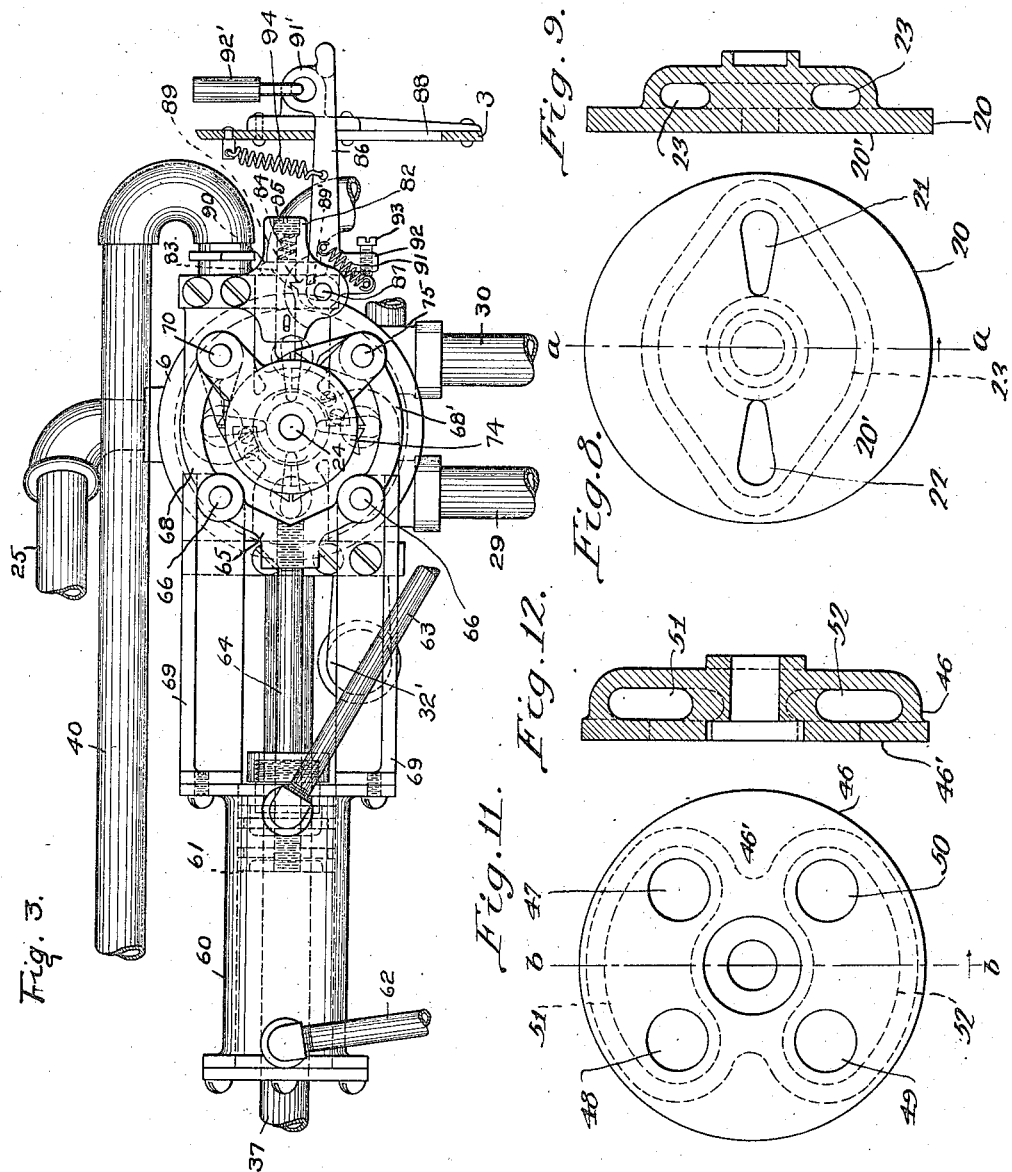

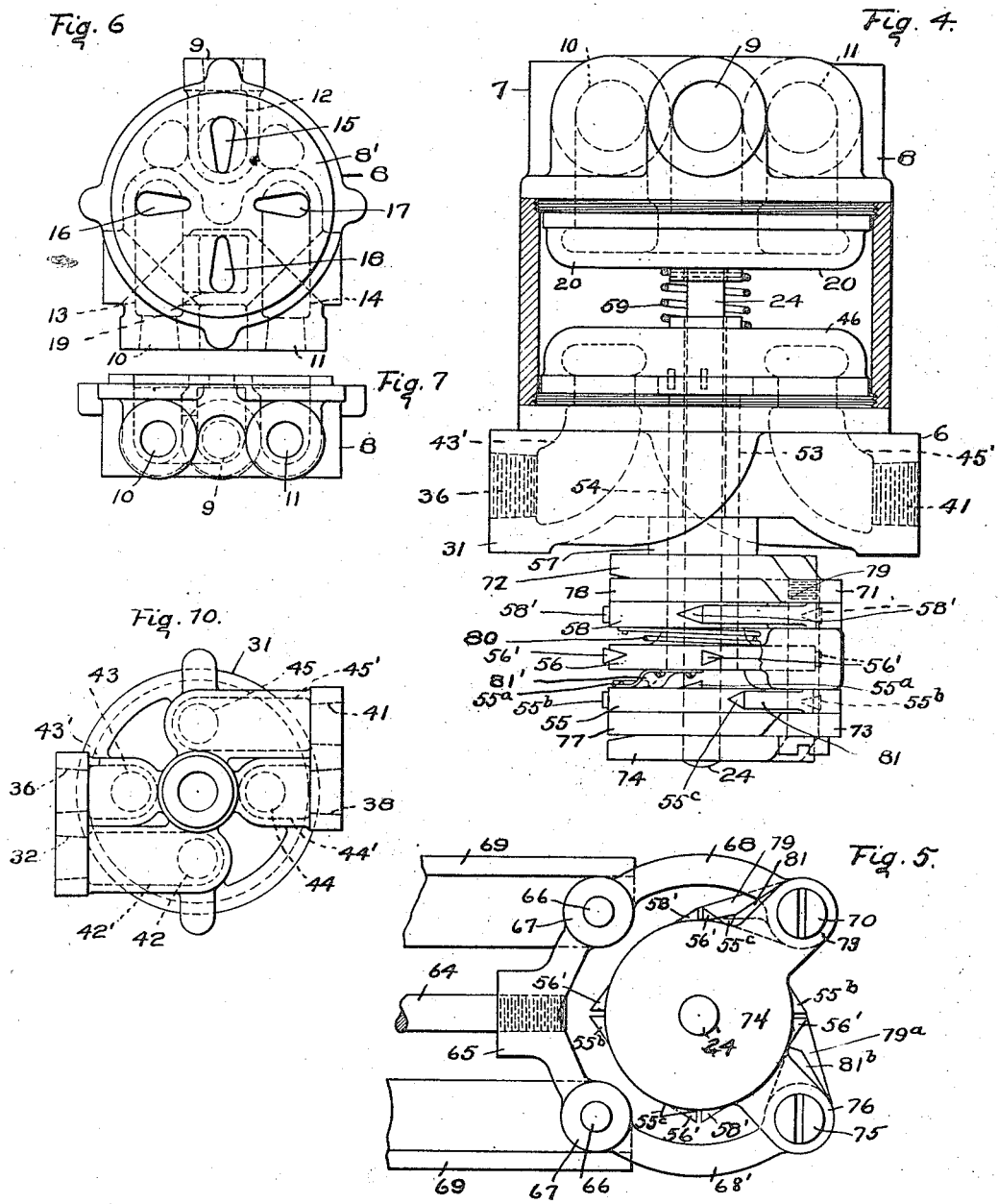

G. S. HANFORD.
LIQUID MEASURING AND DELIVERY DEVICE.
APPLICATION FILED JAN. 5, 1911.
1,046,781.
Patented Dec. 10, 1912.
5 SHEETS—SHEET 5.
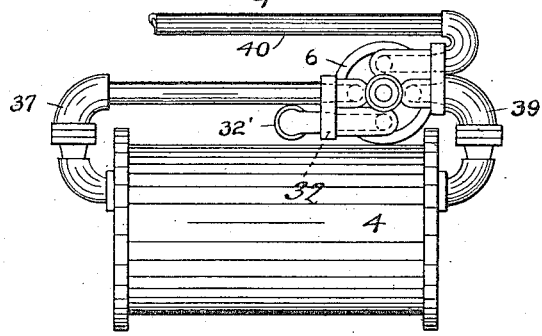
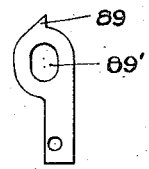
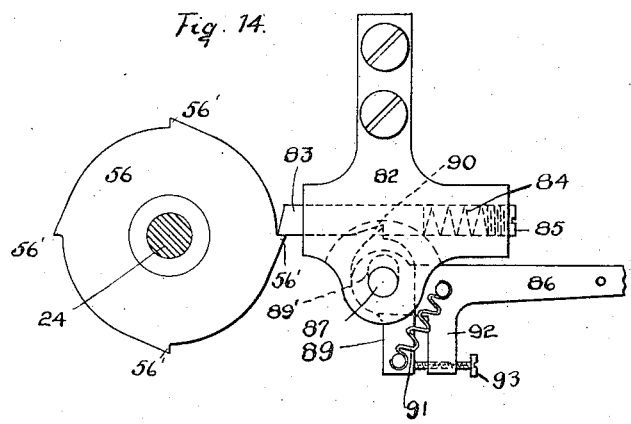
Inventor
George S. Hanford
Witnesses
Isaac N. Taylor
Helen J. Glenn.
by Taylor & Hulse
Attorneys

UNITED STATES PATENT OFFICE.

GEORGE S. HANFORD, OF CLEVELAND, OHIO, ASSIGNOR OF ONE-HALF TO BENJAMIN F. PETTIT, OF FORT WAYNE, INDIANA.

LIQUID MEASURING AND DELIVERY DEVICE.

1,046,781.

Specification of Letters Patent.

Patented Dec. 10, 1912.

Application filed January 5, 1911. Serial No. 601,008.

*To all whom it may concern:*

Be it known that I, GEORGE S. HANFORD, a citizen of the United States, residing at Cleveland, in the county of Cuyahoga and State of Ohio, have invented new and useful Improvements in Liquid Measuring and Delivery Devices, of which the following is a specification.

My present invention relates to improvements in liquid measuring and delivery devices in which liquid in a storage reservoir is pneumatically forced out of the same and delivered at a desired point in measured quantities. Its object is to provide simple and efficient devices for controlling the admission and release of the pneumatic pressure to and from the liquid reservoir, and for directing the flow of the liquid to and from a measuring cylinder, the liquid under pressure being effective to release the pressure on the liquid reservoir. I accomplish these objects by the novel construction and arrangement of parts hereinafter described and illustrated in the drawings, in which—

Figure 2:
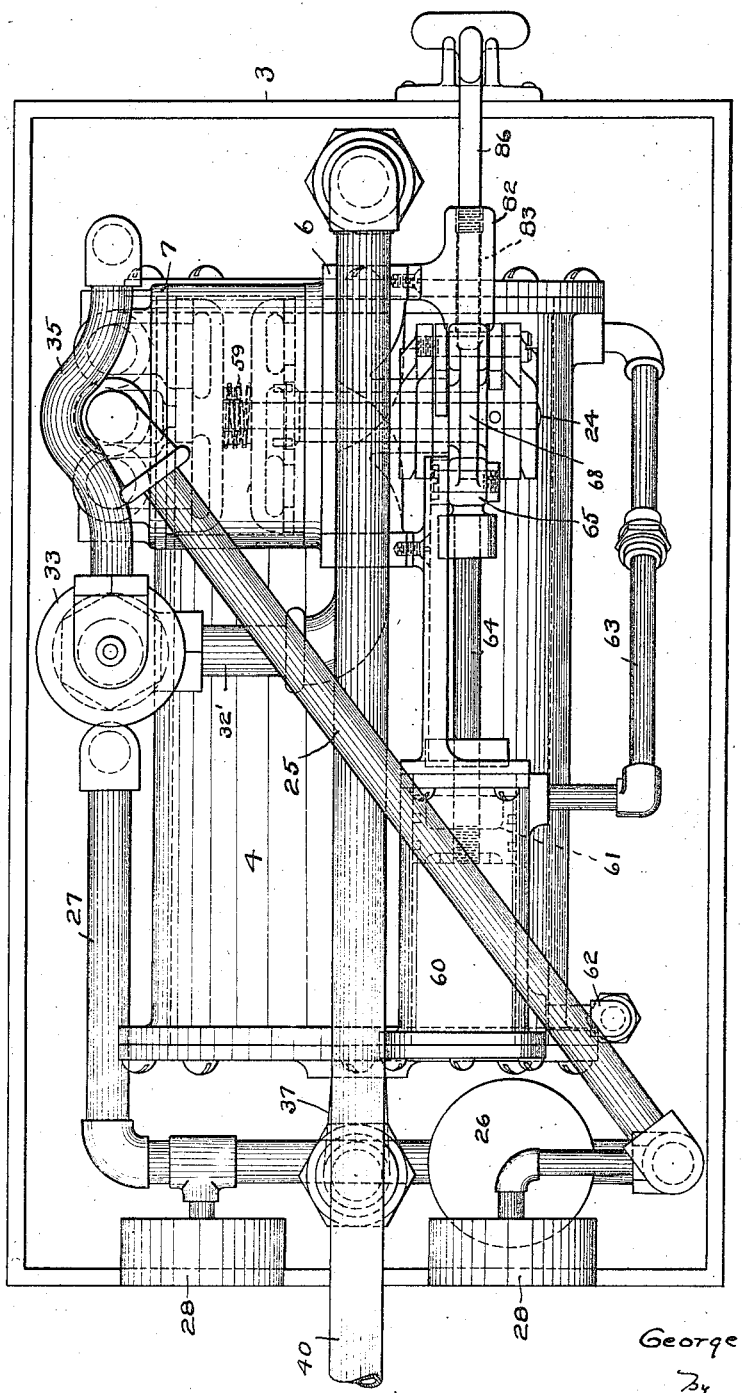

Figure 1 is a front elevation of the devices constructed according to my invention; Fig. 2, an enlarged plan view of the same, the reservoirs being omitted; Fig. 3, a front elevation of the controlling devices; Fig. 4, an enlarged plan, partially in section, of the controlling valves and actuating ratchet disks; Fig. 5, an enlarged front elevation of the ratchet disks and actuating yoke connections; Fig. 6, a front elevation of the stationary portion of the air controlling valve; Fig. 7, a bottom plan of Fig. 6; Fig. 8, a plan of the rotary portion of the air valve; Fig. 9, a section of Fig. 8 on line *a—a;* Fig. 10, a front elevation of the liquid controlling valve; Fig. 11, a front elevation of the rotary portion of the liquid controlling valve; Fig. 12, a section of Fig. 10 on line *b—b;* Fig. 13, an elevational view of the measuring cylinder and controlling valve with pipe connections between the same; Fig. 14, a detail view of the locking mechanism and releasing lever; and Fig. 15, an elevational view of the pawl which forms part of the lock releasing mechanism.

Referring to the drawings, which illustrate one exemplification of my invention, 1 is the storage reservoir or tank for the liquid, which tank is buried in the ground outside the building, or is placed in the cellar or other desired location.

2 is the pressure reservoir or tank to which air under pressure is supplied by suitable means. At any desired location within or without the building is arranged a housing 3, which contains the measuring cylinder 4 and the controlling devices hereinafter described. A suitable floating piston 5 is arranged within cylinder 4 and is adapted to force the liquid which is within the cylinder out of the same to the discharge point, as hereinafter more fully described. Suitably mounted on cylinder 4 are two valves 6 and 7. Valve 7 is the air controlling valve and comprises a valve body 8, (Figs. 4, 6 and 7) having three exterior ports 9, 10 and 11, which lead into channels or passageways 12, 13 and 14 respectively. The front surface 8' of body 8 is flat and is provided with four ports 15, 16, 17 and 18, port 15 leading into passageway 12, port 16 into passageway 13, port 17 into passageway 14 and port 18 into passageway 13 through intermediate passageway 19. Seated on this flat surface 8' is the rotatable member 20 of valve 7 having a corresponding flat surface 20' (Figs. 8 and 9) which is provided with ports 21 and 22 to register with any opposite pair of ports 15, 16, 17 and 18, and which are connected by a passageway or channel 23 formed within member 20. Member 20 is secured to a stem or shaft 24 which extends forwardly and carries adjacent its outer end a ratchet disk 55 which will be described hereafter.

Port 9 of valve 7 is connected by pipe connection 25 to one side of a suitable reducing valve 26, the other side of which valve is connected by pipe connection 27 to air reservoir 2. Suitable pressure gages 28 may be connected with pipe connection 25. Port 10 of valve 7 is connected by pipe connection 29 with the top of reservoir 1 and port 11 is connected by pipe connection 30 with the atmosphere.

In front of valve 7 and preferably concentrically mounted therewith is arranged valve 6. Valve 6 comprises a fixed body 31 (Figs. 10, 11 and 12) having four exterior ports 32, 36, 38 and 41. To port 32 is connected pipe connection 32' (Figs. 1 and 13) which is also connected to a suitable vent 33. A pipe connection 34 connects vent 33 with the bottom of reservoir 1, and the vent, if desired may be connected by pipe 35 to pipe connection 30. Port 36 of valve 6 is connected by pipe connection 37 with one end of cylinder 4 and port 38 is connected by pipe connection 39 with the opposite end of cylinder 4. A liquid discharge pipe 40 is connected to port 41 of valve 6. Valve body 31 is provided with a flat rear surface and four ports 42, 43, 44 and 45 are formed therein, which lead into passageways or channels 42′, 43′, 44′ and 45′ within the body, to which passageways the four exterior ports 32, 36, 38 and 41 also lead respectively. A rotatable member 46 having a corresponding flat surface 46′ is adapted to seat on the flat rear surface of body 31. Four ports 47, 48, 49, 50 are formed in this surface which register with ports 42, 43, 44 and 45 in body 31 and these ports lead into two passageways 51 and 52 in member 46 so as to connect the ports in pairs. Member 46 is secured to a sleeve 53 (Fig. 4) through which stem or shaft 24 passes, the sleeve passing loosely through a suitable opening 54 in valve body 31. Sleeve 53 carries at its forward end a ratchet disk 56, and loosely mounted on projection or hub 57 of valve body 31 is a ratchet disk 58. A suitable spring 59 is disposed between rotatable members 20 and 46 and insures the seating of both members on their respective seats.

Suitably mounted within housing 3, as on cylinder 4, is a cylinder 60, having operative therein a piston 61. Opposite ends of this cylinder are connected to the corresponding ends of cylinder 4 by pipe connections 62 and 63. Piston 61 is provided with a piston rod 64, the outer end of which is connected to a yoke 65. The outer ends of yoke 65 are bifurcated and each carries a pivot 66 on which is mounted an anti-friction roller 67 and one extremity of links 68 and 68′. Rollers 67 roll on horizontal guides 69 which are suitably supported on cylinder 4. The outer extremity of link 68 is loosely connected to pin 70 which is carried by lug 71 which projects from disk 72, disk 72 being loosely mounted on hub 57. Pin 70 is also carried by lug 73 on disk 74 which is loosely mounted on stem or shaft 24. The outer extremity of link 68′ is loosely connected to pin 75, which pin is carried by lug 76 on disk 77 which is loosely mounted on stem or shaft 24, the pin being also carried by disk 78 which is loosely mounted on hub 57.

The periphery of disk 56 is provided with four equidistant ratchets or teeth 56′ which are disposed thereon in symmetrical positions relatively to ports 47, 48, 49, 50 in valve 6. A torsion spring 80 is connected at one end to the rear face of disk 56 and at its other end to the front face of disk 58. A pawl 81′ projects laterally from the forward face of disk 56 and is adapted to engage any one of four teeth or ratchets 55$^a$ on the rear face of disk 55. On the periphery of disk 55 are provided four ratchets or teeth 55$^b$, 55$^c$. Ratchets 55$^b$ are diametrically opposite each other and are symmetrically disposed relatively to the ratchets or teeth 56′ on disk 56 and to ports 21, 22 in valve 7, and ratchets 55$^c$ lag approximately 20° behind that symmetrical position, the direction of lag being opposite to the direction of rotation of disk 55 and the movable member 46 and 20 of valves 6 and 7 respectively. Ratchets 55$^b$ and 55$^c$ are adapted to be engaged by pawl 81 which is mounted on pin 70 and by a similar pawl 81$^b$ (Fig. 5) mounted on pin 75.

Disk 58 is provided on its periphery with four equidistant ratchets or teeth 58′ which, in the normal position of the disk, are symmetrically disposed relatively to ratchets or teeth 56′ on disk 56. Ratchets 58′ are adapted to be engaged by pawl 79 which is mounted on pin 70 and by a similar pawl 79$^a$ which is mounted on pin 75. Pawls 79, 79$^a$ are longer than pawls 81, 81$^b$, the proportion of length being such that, when piston 61 is set into motion, it will cause pawl 79 or 79$^a$ to drive disk 58 approximately 20° beyond its symmetrical position with respect to disk 56, while pawl 81 or 81$^b$ will drive disk 55 to a position approximately 20° behind its symmetrical position relatively to disk 56, in which lagging position member 20 of valve 7 will only partially open ports 16, 17 in valve 7 to establish partial release of the pressure on tank 1. Pawls 79 and 81 are intended to be used to drive disks 58 and 55 when piston 61 is moved to the left (Figs. 3, 5) and pawls 79$^a$ and 81$^b$ are used for the same purpose when piston 61 is moved to the right. By this arrangement the two disks are driven in the same direction at each stroke of piston 61. Disk 58 may be manually rotated for the purpose of adjusting the torsional tension on spring 80.

In a suitable frame 82 is slidably (Fig. 14) mounted a bolt 83, which is opposed by spring 84, 85 being an adjustable screw plug by which the tension of spring 84 may be varied. The free end of bolt 83 is adapted to engage the peripheral ratchets or teeth 56′ on disk 56 and hold the disk from movement. Beneath bolt 83 is a lever 86 which is pivoted at 87 to frame 82 and projects outwardly through a suitable slot or opening 88 in housing 3. A pawl 89 is pivotally mounted on pivot 87, its upper extremity being adapted to engage a suitable notch or other catch 90 in bolt 83. A spring 91 is secured at one end to the lower arm of pawl 89 (Figs. 14, 15) and at its other end to lever 86, and tends to oppose the movement of the upper arm of the pawl away from disk 56. A lug 92 depends from lever 86 adjacent pawl 89 and supports an adjustable member 93. The lug 92 or member 93 is intended to make contact with the lower arm of pawl 89, and when lever 86 is depressed to rock the pawl on its pivot to withdraw bolt 83 from its engagement with disk 56. As soon as the pawl clears the engaging notch in bolt 83, the bolt is instantly forced back into contact with disk 56 and the return of lever 86 to its normal position by means of spring 94, which is connected to lever 86 and housing 3, returns pawl 89 into engagement with notch 90. Pawl 89 is provided with an elongated opening 89' through which pivot 87 passes, and which opening upon the return of lever 86 to its normal position, permits the pawl to accommodate the necessary change in the length of its upper arm as it slides along the lower surface of bolt 83 into engagement with notch 90. The projecting end of lever 86 may be provided with means by which the lever may be locked to prevent unauthorized movement of the same. In Fig. 3 I show the projecting end of the lever provided with a ring 91' to coact with a similar ring mounted on the exterior of housing 3, a padlock 92' serving to lock the two rings together.

The operation of my invention is the following: Reservoir 1 contains the liquid to be measured and delivered and reservoir 2 contains the substance producing the actuating pressure, and, for example, let the devices be at rest, pistons 5 and 61 being at the right hand ends of cylinders 4 and 60 respectively, and cylinder 4 being full of the liquid. Lever 86 is in its upper normal position, pawl 89 engages bolt 83 and the bolt engages one of the teeth 56' on disk 56. The pawls on pivot 70 are in engagement with disks 55 and 58. In this position of pistons 5 and 61, air controlling valve 7 is in the position in which it has cut off the pressure supply from reservoir 2 by closing port 15 in valve body 8. Ports 16 and 17 therein are open so that there is communication between the top of reservoir 1 and the atmosphere through connections 29 and vent pipe 30 and also communication between vent 33 and pipe 30. Liquid control valve 6 is in the position in which it has opened communication between reservoir 1 and pipe connection 37 and between pipe connection 38 and discharge pipe 40. The parts in the relative positions just described are in the normal position of rest.

When lever 86 is depressed pawl 89 is moved with it thereby withdrawing bolt 83 from disk 56. Spring 80 causes disk 56 to rotate, the quick return of bolt 83 causing it to meet the next tooth 56' on the disk, and holding it from further movement. Disk 56 has rotated a quarter turn and has carried with it disk 55 since side pawl 81' engages one of the teeth 55ᵃ on disk 55. This simultaneous movement of disks 55 and 56 rotates members 20 and 46 of valves 7 and 6 a quarter turn thereby establishing communication between connections 34 and 39 and between connection 37 and discharge pipe 40, and between pressure connections 25 and 29 and closing the communication to vent pipe 30. The pressure in reservoir 2, as reduced by reducing valve 26, is now effective to displace the liquid in reservoir 1 and drive the same through pipe connections 34 and 39 into cylinder 4 where the same is effective to force piston 5 to the opposite end of the cylinder. This movement of the piston forces the liquid in the cylinder out through pipe connection 37, through valve 6 into discharge pipe 40, to the desired point where it may be collected by the operator.

When piston 5 has completed its stroke the pressure behind the same builds up and the liquid passes from cylinder 4 through pipe connection 63 into cylinder 60—in the rear of piston 61—where it is effective to force piston 61 to the opposite end of its cylinder.

There is atmospheric pressure, only, on the opposite side of piston 61, because the piston has been at rest since its previous opposite movement and there is no pressure on the liquid in the reservoir 1 or in the cylinders 4 and 60 until lever 86 is actuated as above described. Consequently, with atmospheric pressure on one side of piston 61 and the built up pressure of the liquid in cylinder 4 on the other, there is an unbalanced state of pressures on the piston, and the built-up pressure being greater than that of atmospheric pressure, it drives piston 61 to the opposite end of cylinder 60. This movement of piston 61 draws yoke 65, links 68, 68', pivots 70 and 75 and the pawls mounted on those pivots with it. Disks 55 and 58 are thereby caused to rotate. The rotation of the disk 58 restores the torsional tension on spring 80 and the rotation of disk 55 is imparted to stem or shaft 24 and member 20 of valve 7 causing the latter to rotate, thereby cutting off the communication between reservoirs 1 and 2 and opening communication between reservoir 1 and vent pipe 30 through connection 29 and the valve. The fluid under pressure in reservoir 2 is thereby cut off from reservoir 1 and vent 33 permits, in the usual manner, the liquid to drain from connection 34 back into reservoir 1.

Since pawl 81 is designed to rotate disk 55 approximately 20° less than a full quarter turn the disk comes to rest for an instant in its lagging position so that ports 21 and 22 in member 20 of valve 7 only partially expose ports 16 and 17 in body 8 of that valve. In this position pawl 81ᵇ is in contact with the lower lagging tooth 55ᶜ. A partial exhaust is thereby established between reservoir 1 and vent pipe 30. Since pawl 79 is of sufficient length to drive disk 58 approximately 20° beyond a quarter turn, the tension on spring 80 is increased beyond its initial amount, and will tend to recoil to its initial amount. Links 68 and 68' are, of course, pulled outwardly by the movement of piston 61 and as soon as the stroke of the piston is completed will settle back to their normal positions relatively to the disks. This settling back movement is influenced by the recoil of disk 58 and as it takes place pawl 81ᵇ drives disk 55 and member 20 to their symmetrical positions, so that full release of the fluid under pressure in tank 1 is permitted through connection 29 and vent pipe 30. The object in providing this delayed establishment of release of the fluid under pressure in tank 1 is to insure the completion of the full stroke of piston 61, before much of the pressure in tank 1 is released. When lever 86 is again depressed disk 56 is again released and again rotates another quarter turn and rotates liquid control valve 6 a quarter turn, thereby reversing the communication between reservoir 1, cylinder 4 and discharge pipe 40, and disk 55 which is rotated by disk 56 also causes valve 7 to open communication between reresrvoir 1 and reservoir 2 and close reservoir 1 to vent 30 as above described. The liquid under pressure is therefore directed by valve 6 into the opposite end of cylinder 4 to that of the previous operation and moves piston 5 in the opposite direction to force the liquid in cylinder 4 out through valve 6 and discharge pipe 40. When this stroke of piston 5 is completed the built up pressure of the liquid enters from cylinder 4 into cylinder 60 and behind piston 61 to cause the latter to move to the opposite end of cylinder 60. This movement of piston 61 drives yoke 65 and links 68, 68' to the right (Fig. 5) and brings into play lower pawls 79ᵃ and 81ᵇ mounted on pin 75 which engage their respective disks 55 and 58 and rotate the same as did the upper pawls on the former movement, and the same operations take place during this movement as took place on the former movement. The ratchet disks and valves 6 and 7 are therefore rotated in the same direction upon each stroke of control piston 61, and the control piston is actuated each time by the pressure produced on the liquid in reservoir 1 which is supplied from reservoir 2. When the pressure on the liquid is cut off and exhausted by valve 7, piston 61, being under the influence of the torsional tension of spring 80, is returned by that spring a fraction of a stroke. The disks on shaft 24 also continue to rotate until they have assumed a symmetrical position. When this return movement of piston 61 takes place and the several disks are in the symmetrical position on shaft 24, the liquid, which has entered cylinder 60 from cylinder 4, flows back into cylinder 4 and from it through connections 37 or 39, valve body 46 of valve 6 and connection 29 to reservoir 1. The measuring cylinder 4 is proportioned so that each stroke of piston 5 will deliver a predetermined quantity of liquid at the discharge end of pipe 40. The several other devices are also properly proportioned and timed as to movement to carry out the objects of my invention.

Many modifications in structure and arrangement of parts are, of course, possible, hence I do not wish to be limited to the precise structure and arrangement herein described.

What I claim is:

1. The combination with a liquid storage reservoir and a measuring cylinder having communication with the reservoir, means to control the communication, a pressure reservoir having communication with the liquid reservoir, means to control the latter communication, a spring actuated means having connection with both said controlling means to actuate the same to permit the pressure to force the liquid into and out of the cylinder and means for actuating the controlling means to release the fluid under pressure in the storage reservoir, said means having communication with the cylinder and being operative by the pressure in the cylinder.

2. The combination with a liquid storage reservoir and a measuring cylinder having communication with the reservoir of means to control the said communication, a pressure reservoir having communication with the storage reservoir, means to control the latter communication, of a spring actuated means in connection with both controlling means to actuate the same to establish communication between the two reservoirs, a cylinder having communication with the measuring cylinder, and a piston in the cylinder having a connection with the pressure communication controlling means, the parts being so arranged that the pressure in the measuring cylinder is effective to actuate the piston to cause the latter controlling means to cut off the communication between the two reservoirs.

3. The combination of a liquid storage reservoir, a measuring cylinder having communication with the reservoir, means to control the communication, a pressure reservoir having communication with the storage reservoir, means to control the latter communication, means connected to both controlling means to actuate the same to pneumatically force the liquid into and out of the measuring cylinder, and means to release the fluid under pressure on the liquid comprising a cylinder having communication with the measuring cylinder, a piston in said cylinder and operatively connected to the pressure controlling means, the parts being so arranged and connected that the pressure on the liquid in the measuring cylinder and storage reservoir actuates the piston to cause the pressure controlling means to release the fluid under pressure in the liquid reservoir.

4. The combination with a liquid storage reservoir, a discharge pipe, a measuring cylinder having a piston therein and having communication with the storage reservoir and the discharge pipe, a valve to control the communications, a pressure reservoir having communication with the storage reservoir, a valve to control the latter communication, means to simultaneously actuate at will both valves to establish communication between the two reservoirs and between the storage reservoir, the measuring cylinder and the discharge pipe, a cylinder having communication with the measuring cylinder, a piston in the cylinder having a connection with the pressure controlling valve whereby the pressure on the liquid in the storage tank is effective to actuate the piston to cause the latter valve to release the fluid under pressure.

5. The combination of a liquid storage reservoir, a discharge pipe, a measuring cylinder having communication with the reservoir and the discharge pipe, a valve to control the communication, a pressure reservoir having communication with the storage reservoir, a valve to control the latter communication, a spring actuated rotatable disk having a connection with the liquid communication controlling valve, means to releasably hold the disk from rotation, a disk having a connection with the pressure controlling valve and having a driving connection with the first named disk, means operatively connected to that last named disk and having communication with the measuring cylinder, the parts being so arranged that the rotation of the last named disk by the rotation of the spring actuated disk, actuates the pressure controlling valve to admit pressure into the storage reservoir to force the liquid into and out of the measuring cylinder, and the pressure in the reservoir is effective to actuate the pressure controlling valve and cause the same to cut off the supply of fluid under pressure to the liquid reservoir.

6. The combination with a liquid storage reservoir, a measuring cylinder having communication with the reservoir, a valve to control the communication, a pressure reservoir having communication with the storage reservoir, and a valve to control the latter communication, of a disk having a connection with the liquid controlling valve, means connected to the disk to rotate the same, means to control the rotation of the disk, a second disk having a connection with the pressure control valve and operatively connected to the first named disk and rotated thereby, to cause the latter valve to rotate, whereby communication between the two reservoirs is established and fluid pressure actuated means operatively connected to the second disk for rotating the same and the fluid controlling valve to release the fluid under pressure in the storage reservoir.

7. The combination of a liquid storage reservoir, a measuring cylinder having communication with the storage reservoir, a valve to control the communication, a pressure reservoir having communication with the storage reservoir, a valve to control the latter communication, a disk operatively connected to the liquid controlling valve and having a torsion spring connected thereto for rotating the same, means to control the rotation of the disk, a second disk operatively connected to the pressure control valve and to the first named disk and rotated simultaneously with the latter disk to admit pressure into the storage reservoir to drive the liquid into and out of the measuring cylinder, and means operatively connected to the second disk and to the torsion spring and having communication with the measuring cylinder whereby the second disk and the pressure control valve are actuated by the pressure in the cylinder to release the fluid under pressure in the storage reservoir and to restore the torsional strain on the torsion spring.

8. In a device of the class described the combination of a liquid storage reservoir, a measuring cylinder having communication with the storage reservoir, a pressure reservoir having communication with the storage reservoir, valves to control the said communications, means connected to the valves for simultaneously actuating the same to admit pressure to the storage tank to force the liquid into and out of the cylinder, and means operatively connected to the pressure control valve for actuating the same to release the fluid under pressure in the storage reservoir comprising a cylinder having communication with the measuring cylinder, a piston in the cylinder, a disk operatively connected to the latter valve and having peripheral ratchets thereon, a pawl to engage the ratchets and operatively connected to the piston, the parts being so arranged and proportioned that the pressure in the measuring cylinder is effective to actuate the piston and pawl whereby the disk and pressure control valve are actuated to release the fluid under pressure in the storage reservoir.

9. In a device of the class described the combination of a liquid storage reservoir, a measuring cylinder having communication with the storage reservoir, a valve to control the communication, a fluid pressure reservoir having communication with the storage reservoir, a valve to control the latter communication, a disk operatively connected to the liquid control valve, a torsion spring connected to the disk and adapted to rotate the same, a slidable member normally engaging the disk and securing the same from rotation, means connected to the slidable member for releasing the same from engagement with the disk to permit the latter to rotate, and means to return the slidable member into engagement with the disk to limit its rotation, means operatively connected to the pressure control valve and to the disk for simultaneously actuating the latter valve to admit the pressure into the storage reservoir and means operatively connected to the last mentioned means for actuating the pressure valve to release the fluid under pressure in the storage reservoir.

In witness whereof I hereunto sign my name this 31st day of December, 1910.

GEORGE S. HANFORD.

Witnesses:
HELEN F. GLENN,
ELWIN M. HULSE.